3,063,964
POLYETHER-URETHANE COMPOSITIONS MODIFIED WITH POLYMETHYLOL PHENOLS
Antoine Khawam, Arbutus, Md., assignor to Allied Chemical Corporation, New York, N.Y., a corporation of New York
No Drawing. Filed Jan. 15, 1960, Ser. No. 2,577
12 Claims. (Cl. 260—47)

The present invention relates to new and improved polyurethane compositions derived from the reaction of polyethers with polyisocyanates. In particular, the invention relates to the use of polymethylol phenols as additives to the polyether-polyisocyanate reaction mixture. The polyether-urethane compositions of the invention are especially suited for the production of semi-rigid to rigid cellular materials.

The reaction of polyether glycols with polyisocyanates to produce polyurethane materials is well known. Of particular interest is the manufacture of cellular products from such polyurethane compositions. There are disadvantages to the employment of polyether glycols in foam formulations, the most serious being slow viscosity build-up and very rapid generation of carbon dioxide gas. The combination of these two factors results in considerable loss of carbon dioxide, i.e. boiling of the foaming mixture, and subsequent collapse due to termination of polymer molecule building. A partial solution to this problem is the cumbersome method of formation of a prepolymer from the polyether glycol and polyisocyanate whereby the viscosity is built up before the foaming reaction. Certain cross-linking agents, such as the alkyoxylated polyamines, are highly reactive but when employed in large amounts can accelerate the polyether glycol-polyisocyanate reaction to such an extent as to make the use of such polyamines in the large scale production of semi-rigid or rigid foams impractical.

An object of the present invention is the production of new cross-linked polyurethane compositions derived from polyether glycols. Another object is the preparation of new improved polyether-urethane cellular materials, possessing a fine uniform cell structure and also increased temperature resistance. A still further object is the preparation of polyether-urethane semi-rigid and rigid cellular products by the "one-shot" method.

The objects are attained by reacting a polyisocyanate, polyether glycol, optionally water, catalysts and emulsifiers in the presence of a polymethylol phenol of the following general formula

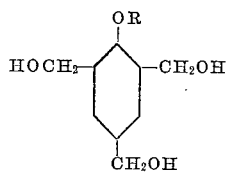

wherein R is hydrogen, or an alkyl or alkenyl group containing not more than 5 carbon atoms. The use of these trimethylol phenols as cross-linking agents for polyether glycol-urethanes results in the build-up of macromolecules possessing a high viscosity which under appropriate conditions produce good quality semi-rigid and rigid foams. Preparation of the trimethylol phenols is disclosed in U.S. Patent 2,579,329 of December 18, 1951, particularly col. 6.

A wide variety of organic polyisocyanates may be employed in the process of the present invention to react with the polyether glycol. The preferred organic isocyanates are those of the aromatic series such as phenylene diisocyanates, tolylene diisocyanates (pure isomers or isomeric mixtures thereof), naphthalene diisocyanates, 4,4'-diphenylmethane diisocyanate or substitution products thereof such as the 3,3'-dialkyl or dihalogeno, etc. The arylene diisocyanates may be modified before use, that is "partial prepolymers" may be obtained by reaction with various amounts of 1,2,6-hexanetriol or 1,1,1-trimethylolpropane. The amount of organic polyisocyanate employed is such that there is an excess of available isocyanate groups over the total number of reactive hydroxyl groups available from the polyether glycol and the polymethylol phenol cross-linking agent; in general the ratio of NCO groups to OH groups is within the range of 1 to 10:1, preferably in the range of 2 to 5:1.

When cellular products are desired, the above mentioned organic polyisocyanates may be pre-reacted with the polyether glycols before carrying out the foaming reaction, or all the ingredients may be blended together according to the "one-shot" method.

The polyether glycols suitable for the purposes of the present invention are generally those having a molecular weight in the range of from about 1500 to about 15,000 and possessing a plurality of terminal primary hydroxyl groups. The preferred polyether glycols of this type are the polyalkylene ether glycols such as polyethylene ether glycols or polypropylene ether glycols. Other polyethers that can be employed in the process of the present invention include polythioethers with reactive hydroxyl groups, products from the reaction of ethylene oxide or propylene oxide on polyhydroxy compounds such as glycerol, sorbitol, mannitol, castor oil, etc.

According to the present invention, superior quality polyurethane compositions, especially cellular materials, may be obtained from the reaction of polyisocyanates with polyether glycols in the presence of the new cross-linking agents, polymethylol phenols of the general formula given hereinbefore. To produce cellular materials, the reaction is carried out in the presence of a suitable blowing agent, e.g. water ($CO_2$), fluorocarbons, etc., as is known. Optionally other additives such as accelerators, fillers, modifiers, emulsifiers, etc., may be employed in known manner. The trimethylol phenols are particularly efficient cross-linking agents, allowing the employment of the "one-shot" method for the production of cellular polyether-urethane compositions. Suitable cross-linking compounds are illustrated by 2,4,6-trimethylol allyloxy benzene; 2,4,6-trimethylol methoxy benzene; 2,4,6-trimethylol ethoxy benzene; 2,4,6-trimethylol butoxy benzene; 2,4,6-trimethylol isopropoxy benzene; 2,4,6-trimethylol amoxybenzene; 2,4,6-trimethylol-2-butenyloxy benzene; and the parent compound 2,4,6-trimethylol phenol.

The amount of polymethylol phenol cross-linking agent employed can be varied over a wide range, generally from about 5% to about 75% by weight based on the weight of the polyether glycol and preferably in the range of 25% to 45% by weight based on the weight of the polyether glycol.

The intimate blending of the reactive ingredients in particular the uniform dispersion of the water, is facilitated by the use of a surface active agent, preferably, a non-ionic emulsifier. Suitable emulsifying agents include the following, polyethylene phenol ethers, blends of polyalcohol carboxylic acid esters and oil soluble sulfonates.

The catalysts found to be most effective are tertiary amines such as N-alkyl morpholines, trialkylamines, N-dialkyl piperazines and those tertiary amines of sufficiently basic character that contain hydroxy groups of which type the following may be mentioned—dimethylethanolamine, methyldiethanolamine and triethanolamine; other suitable catalysts include metallic compounds such as lead or cobalt naphthenate, dibutyltin dilaurate. In some instances mixtures of catalysts have been found especially advantageous.

The more detailed practice of the invention is illustrated by the following examples, in which parts given are by weight and temperature in degrees centigrade.

EXAMPLE 1

Semi-rigid to rigid foams were prepared from a trifunctional polyether glycol (Dow Chemical Co., No. 112–3, terminal primary hydroxyl groups, average molecular weight 3300) by reaction with a modified diisocyanate ("Nacconate" 1080–H, reaction product from 90% by weight of "Nacconate" 80, 80% 2,4-isomer and 20% 2,6-isomer of tolylene diisocyanate, with 10% by weight of 1,2,6-hexanetriol), water, catalyst, e.g. dimethylethanolamine and a surfactant, e.g. "Triton" X–100, in the amounts shown in Table I below; cross-linking being accomplished by the use of 2,4-trimethylol allyloxybenzene.

and the special cross-linking agent 2,4,6-trimethylol allyloxybenzene; the ingredients were employed in the amounts shown in Table I. The polyisocyanate ("Nacconate" 1080–H, tolylene diisocyanate-hexanetriol adduct) was stirred into the premix for several seconds before pouring the reaction mixture into molds (open or closed) or spraying onto a surface, e.g. vertical such as walls.

Foams obtained from the above ingredients possessed a fine uniform cell structure, good temperature resistance, excellent adhesion and were semi-rigid.

EXAMPLE 3

The procedure of Example 2 was employed using another commercially available tetrafunctional polyether glycol ("Tetronic" 901, Wyandotte, terminal primary hy-

*Table I*

EXAMPLE 1

| Polyether glycol (Dow No. 112-3) | Polyisocyanate | $HOCH_2\text{-}\bigcirc(O.CH_2.CH=CH_2)\text{-}CH_2OH$ / $CH_2OH$ | Water | Catalyst | Surfactant | Density of the foam, lbs./cu. ft. |
|---|---|---|---|---|---|---|
| 100 | 145 | 25 | 7 | 1 | 1 | 1.5 |
| 100 | 160 | 35 | 7 | 1 | 1 | 1.6 |
| 100 | 139 | 40 | 5 | 1 | 1 | 1.75 |
| 100 | 104 | 35 | 3 | 1½ | 1 | 3.1 |
| 100 | 91 | 35 | 2 | ½ | 1 | 7.2 |
| 100 | 83 | 35 | 1½ | 1½ | 1 | 8.4 |
| 100 | 83 | 35 | 1½ | ½ | 1 | 9.0 |

EXAMPLE 2

| Polyether glycol (Tetronic 701) | Polyisocyanate | $HOCH_2\text{-}\bigcirc(O.CH_2.CH=CH_2)\text{-}CH_2OH$ / $CH_2OH$ | Water | Catalyst | Surfactant | Density of the foam, lbs./cu. ft. |
|---|---|---|---|---|---|---|
| 80 | 139 | 40 | 5 | 1 | 1 | 1.4 |
| 80 | 104 | 35 | 3 | 1½ | 1 | 1.8 |
| 80 | 83 | 35 | 1½ | 1½ | 1 | 3.0 |

EXAMPLE 3

| Polyether glycol (Tetronic 901) | Polyisocyanate | $HOCH_2\text{-}\bigcirc(O.CH_2.CH=CH_2)\text{-}CH_2OH$ / $CH_2OH$ | Water | Catalyst | Surfactant | Density of the foam, lbs./cu. ft. |
|---|---|---|---|---|---|---|
| 100 | 82 | 35 | 3 | 1½ | 1 | 4.2 |
| 100 | 72 | 35 | 1½ | 1½ | 1 | 10.8 |

The cellular materials were obtained by preparing a premix of the polyether glycol, trimethylol allyloxybenzene, water, catalyst and surfactant. The polisocyanate was added to the premix, the reaction mass stirred for a few seconds before pouring into molds, and the foam so produced was allowed to cure at room temperature for several hours. These semi-rigid foams possessed a fine uniform cell structure and exhibit no shrinkage even on heating at 110° C. for twenty-four hours.

EXAMPLE 2

A premix was prepared from a polyether glycol ("Tetronic" 701, Wyandotte Chemicals Corp., tetrafunctional having terminal primary hydroxyl groups, average molecular weight 3400), water, a catalyst (tertiary amine, dimethylethanolamine), a surfactant ("Triton" X–100)

droxyl groups; average molecular weight 5,000–6,000) in place of "Tetronic" 701.

The cellular materials possessed similarly excellent physical properties to the foams obtained when employing the other polyether glycols.

EXAMPLE 4

By the use of the new cross-linking agents a standard flexible foam prepolymer (from polyether glycol and diisocyanate) can be utilized for the preparation of a semi-rigid foam; a two package system is employed.

A mixture of 205 parts tolylene diisocyanate ("Nacconate" 80, 80% 2,4-isomer, 20% 2,6-isomer), 600 parts polyether glycol ("Pluronic" L–61, Wyandotte Chemicals Corp., difunctional polyether glycol from propylene and ethylene oxides with terminal hydroxyl groups and having an average molecular weight 2000) and 9 parts trimethylol propane was heated to 120° C. for 2½ hours to produce a prepolymer having a viscosity of about 20,000 centipoises at 25° C.

A two package system was employed to produce semi-rigid foams. An emulsion was made from 35 parts of trimethylol allyoxybenzene, 3 parts of water, 1 part of dimethylethanolamine and 1 part of surfactant ("Triton" X–100). This emulsion was blended by vigorous stirring with a mixture consisting of 100 parts of the prepolymer prepared as above and 85 parts of tolylene diisocyanate ("Nacconate" 80). The resulting foam had a density of 3.2 lbs. per cu. ft., was semi-rigid, had a fine uniform cell structure and possessed good temperature resistance.

Although certain preferred embodiments of the invention have been disclosed for purpose of illustration, it will be evident that various changes and modifications may be made therein without departing from the scope and spirit of the invention.

I claim:
1. A highly cross-linked polyether polymethylol phenol-polyurethane composition obtained by conjoint reaction of an aromatic diisocyanate, a polyether polyol, and a cross-linking agent to build-up macromolecules possessing high viscosity consisting of a polymethylol phenol of the formula

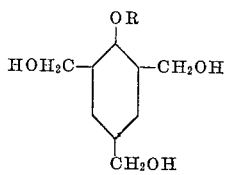

wherein R is selected from the group consisting of hydrogen, and alkyl and alkenyl groups containing not more than 5 carbon atoms, said polymethylol phenol amounting to 5% to 75% by weight based on the weight of the polyether polyol, and said organic polyisocyanate being employed in amount such that the ratio of NCO groups to OH groups available from the polyether polyol and polymethylol phenol is within the range of 1 to 10:1.

2. A composition as claimed in claim 1 wherein R is methyl.
3. A composition as claimed in claim 1 wherein R is isopropyl.
4. A composition as claimed in claim 1 wherein R is butyl.
5. A composition as claimed in claim 1 wherein R is allyl.
6. A composition as claimed in claim 1 wherein R is hydrogen.
7. A process for the production of a highly cross-linked polyether polymethylol phenol-polyurethane composition which comprises mixing and conjointly reacting an aromatic diisocyanate, a polyether polyol, and a cross-linking agent to build-up macromolecules possessing high viscosity consisting of a polymethylol phenol of the formula

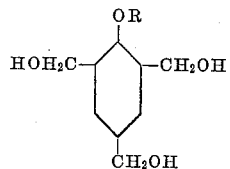

wherein R is selected from the group consisting of hydrogen, and alkyl and alkenyl groups containing not more than 5 carbon atoms, said polymethylol phenol amounting to 5% to 75% by weight based on the weight of the polyether polyol, and said organic polyisocyanate being employed in amount such that the ratio of NCO groups to OH groups available from the polyether polyol and polymethylol phenol is within the range of 1 to 10:1.

8. A process as claimed in claim 7 wherein R is methyl.
9. A process as claimed in claim 7 wherein R is isopropyl.
10. A process as claimed in claim 7 wherein R is butyl.
11. A process as claimed in claim 7 wherein R is allyl.
12. A process as claimed in claim 7 wherein R is hydrogen.

References Cited in the file of this patent
UNITED STATES PATENTS

| | | |
|---|---|---|
| 2,764,566 | Simon | Sept. 25, 1956 |
| 2,916,464 | Ebenth | Dec. 8, 1959 |
| 2,927,905 | Eckert | Mar. 8, 1960 |
| 2,975,146 | Rogers | Mar. 14, 1961 |

FOREIGN PATENTS

| | | |
|---|---|---|
| 590,782 | Canada | Jan. 12, 1960 |